(12) United States Patent
Green

(10) Patent No.: US 6,486,730 B1
(45) Date of Patent: Nov. 26, 2002

(54) VOLTAGE DOWN PUMP AND METHOD OF OPERATION

(75) Inventor: Robert S. Green, Sandy, UT (US)

(73) Assignee: Sonic Innovations, Inc., Salt Lake City, UT (US)

( * ) Notice: Subject to any disclaimer, the term of this patent is extended or adjusted under 35 U.S.C. 154(b) by 11 days.

(21) Appl. No.: 09/695,721

(22) Filed: Oct. 23, 2000

(51) Int. Cl.[7] .................................................. G05F 3/24
(52) U.S. Cl. ........................ 327/541; 327/537; 327/543
(58) Field of Search ................................. 327/538, 540, 327/541, 543, 535, 536, 537

(56) References Cited

U.S. PATENT DOCUMENTS

| | | | |
|---|---|---|---|
| 4,186,335 A | 1/1980 | Cahill | 320/103 |
| 4,539,441 A | 9/1985 | Eggert et al. | 381/323 |
| 4,660,027 A | 4/1987 | Davis | 340/636 |
| 4,922,131 A | 5/1990 | Anderson et al. | 327/66 |
| 5,111,506 A | 5/1992 | Charpentier | 381/320 |
| 5,149,994 A * | 9/1992 | Neu | 327/581 |
| 5,155,428 A | 10/1992 | Kang | 320/136 |
| 5,321,758 A | 6/1994 | Charpentier et al. | 381/317 |
| 5,438,270 A | 8/1995 | Harper et al. | 324/429 |
| 5,442,345 A | 8/1995 | Kwon | 340/7.37 |
| 5,512,857 A | 4/1996 | Koskowich | 330/252 |
| 5,684,404 A | 11/1997 | Millar | 324/426 |
| 5,696,437 A | 12/1997 | Panther et al. | 320/DIG. 21 |
| 5,721,482 A | 2/1998 | Benvegar et al. | 320/106 |
| 5,748,534 A * | 5/1998 | Dunlap et al. | 327/54 |
| 5,900,734 A | 5/1999 | Munson | 324/433 |
| 5,949,725 A * | 9/1999 | Sher | 365/201 |
| 6,011,428 A * | 1/2000 | Tsukude et al. | 327/541 |
| 6,252,442 B1 * | 6/2000 | Malherbe | 327/143 |
| 6,084,389 A * | 7/2000 | Gens et al. | 323/315 |
| 6,166,588 A * | 12/2000 | Miyawaki | 327/540 |

* cited by examiner

Primary Examiner—Timothy P. Callahan
Assistant Examiner—Terry L. Englund
(74) Attorney, Agent, or Firm—Thelen Reid & Priest LLP; Thierry Lo (57) ABSTRACT

A regulated voltage down pump circuit comprises a reference generator circuit receiving a voltage. P channel and N channel device voltage thresholds are measured and compared. A first reference voltage is generated using the largest voltage threshold. A second reference voltage is generated an amount (which may be programmable) above the first reference voltage. The second reference voltage is compared with an output voltage of a pump circuit. When the output voltage is less than the second reference voltage, a clock signal is sent to the pump circuit that generates and pumps up the output voltage to the reference voltage. The pumped voltage at the second reference is then used for logic circuits at reduced power and nearly constant gate delay over voltage, temperature and process variations.

23 Claims, 8 Drawing Sheets

VOLTAGE DOWN PUMP AND METHOD OF OPERATION

BACKGROUND OF THE INVENTION

1. Field of the Invention

The present invention relates to power consumption of integrated circuit designs such as circuits used in hearing aids. More particularly, the present invention relates to generating a lower voltage from a higher voltage and regulating it to a fixed programmable voltage above a reference to achieve a reduction in power consumption.

2. Background Art

Today's integrated circuit industry has produced a class of devices which operate from a relatively low voltage power source with relatively low power consumption. Most known integrated circuit families require an approximately five volt power source to operate properly. Three volt devices are becoming increasingly popular. The reduction in power source voltage requirements reduces the current drawn by the CMOS circuit. In other words, devices which operate at 2.7 volts are more readily adapted for use with power sources such as batteries than devices which operate at five volts. For most battery technologies, batteries which produce 2.7 volts are smaller and simpler than batteries which produce higher voltages. Since one goal in the design of small voltage circuits is to maximize their usefulness with power sources with limited capacity, it is highly desirable to minimize current consumption of each circuit.

Various devices require operation with low power consumption. For example, hand-held communication devices require such low power consumption and, in particular, portable medical devices require low power capabilities. With respect to portable medical devices, for example, digital signal processing-based hearing aid devices are required to operate with a very low power consumption to increase battery life and device longevity.

Generally, such low power devices are designed using complementary metal oxide semiconductor (CMOS) technology. CMOS technology is generally used because such technology has the characteristic of substantially zero "static" power consumption and very low dynamic power consumption.

The power consumption of CMOS circuits consists generally of two power consumption factors, namely "dynamic" power consumption and static power consumption. Static power consumption is only due to current leakage as the quiescent current of such circuits is zero. Dynamic power consumption is the dominant factor of power consumption for CMOS technology. Dynamic power consumption is basically due to the current required to charge internal and load capacitances during switching, i.e., the charging and discharging of such capacitances. Dynamic power (P) is equal to: $1/2 CV_{DD}^2 F$, where C is nodal capacitance, F is the clock or switching frequency of each gate output node, and VDD is the supply voltage for the CMOS circuit. As can be seen from the formula for calculating dynamic power (P), such dynamic power consumption of CMOS circuits is proportional to the square of the supply voltage (VDD). In addition, dynamic power (P) is proportional to switching or node switching frequency (F).

In accordance with the formula for dynamic power consumption, it has been effective conventionally in CMOS integrated circuit designs to scale down the supply voltage for an entire device (e.g., hybrid) or integrated circuit (IC), i.e., operate the circuit at low supply voltages, to reduce power consumption for such designs.

Figure 1:
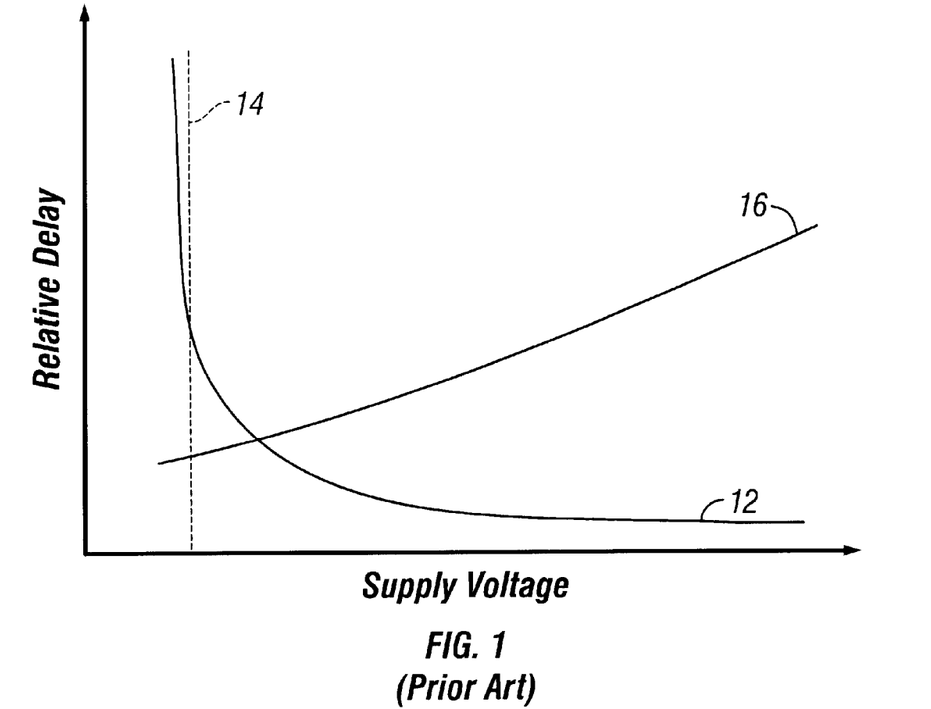
FIG. 1 is graphical illustration showing relative gate delay versus supply voltage for CMOS circuit operation.

FIG. 1 represents a graphical illustration of relative gate delay versus supply voltage for CMOS circuits. The circuit logic delay increases drastically as the supply voltage is reduced to near the threshold of the N or P devices, as represented by delay line 12 and threshold voltage line 14. As the supply voltage is decreased, such energy consumption is reduced by the square of the supply voltage as is shown by relative power line 16. Therefore, considerable power can be saved by lowering the voltage to logic circuits to the lowest possible voltage. The lowest voltage must be where the logic can function reliably for the task at hand.

Figure 2:
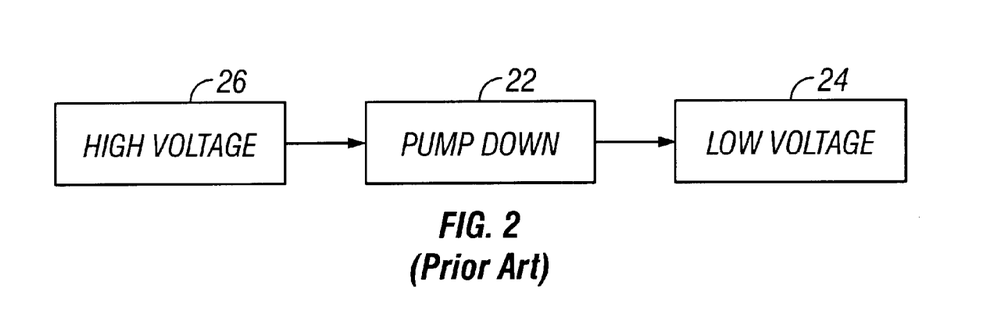
FIG. 2 is a flow diagram illustrating a conventional voltage down pump.

FIG. 2 is a flow diagram illustrating a conventional voltage down pump 22. Although pump 22 provides a mechanism for setting a lower voltage 24 from a higher voltage 26, such pumping action may set a voltage below the threshold of a digital circuit, thereby rendering the digital circuitry inoperable.

Therefore, a need exists for an apparatus and method for regulating a programmable fixed voltage above a CMOS device threshold to keep the gate delay constant as temperature and process variations change. Such a circuit should be able to supply a stepped down regulated voltage for all pertinent digital circuitry. Using a lower voltage that is kept relatively constant as the battery voltage drops saves considerable power.

BRIEF DESCRIPTION OF THE INVENTION

A regulated voltage down pump circuit comprises a reference generator circuit receiving a voltage. P channel and N channel device voltage thresholds are measured and compared. A first reference voltage is generated using the largest voltage threshold. A second reference voltage is generated an amount (which may be programmable) above the first reference voltage. The second reference voltage is compared with an output voltage. When the output voltage is less than the second reference voltage, a clock signal is sent to a voltage pump circuit that generates and pumps up the output voltage to the reference voltage. The pumped voltage at the second reference is then used for logic circuits at reduced power and nearly constant gate delay over voltage, temperature and process variations.

BRIEF DESCRIPTION OF THE DRAWINGS

The accompanying drawings, which are incorporated in and constitute a part of this Specification, illustrate one or more embodiments of the invention and, together with the present description, serve to explain the principles of the invention.

In the drawings.

DETAILED DESCRIPTION OF A PREFERRED EMBODIMENT

One embodiment of the present invention is described herein in the context of regulated voltage down pump used in integrated designs which may, for example, be used in a hearing aid circuit. Those of ordinary skill in the art will realize that the following description of the present invention is illustrative only and not in any way limiting and that, for example, the down pump may be used in any suitable application. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

Figure 3:
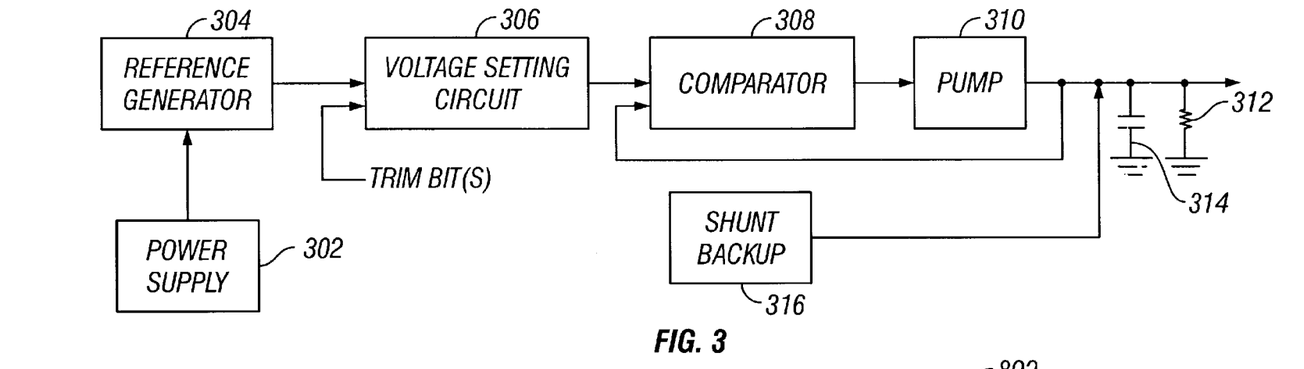
FIG. 3 is a block diagram illustrating a circuit suitable for implementing a method for regulating a voltage down pump in accordance with a specific embodiment of the present invention.

The present invention is directed to circuitry for regulating a voltage down pump. FIG. 3 is a block diagram illustrating a circuit suitable for implementing a method for regulating a voltage down pump according to aspects of the present invention. A power supply 302 supplies an input voltage signal to a reference generator 304. A voltage setting circuit 306 receives a reference voltage from reference generator 304. Voltage setting circuit 306 also receives at least one trim bit, for example four trim bits, that select which point above the reference voltage an output voltage will be set at. A comparator circuit 308 generates a clock signal to a pump circuit 310 whenever the output voltage is lower than the reference voltage. Whenever pump circuit 310 receives the clock signal, it pumps up and generates the output voltage. When the clock signal stops, the pumping stops and the output voltage starts falling as it supplies a load 312. A capacitor 314 provides filtering of the output voltage. When the output voltage falls below the reference voltage, the clock signal starts again pumping the output voltage up. A shunt backup 316 is used to add current capability to pump circuit 310 if or when pump circuit 310 cannot supply enough current.

Figure 4:
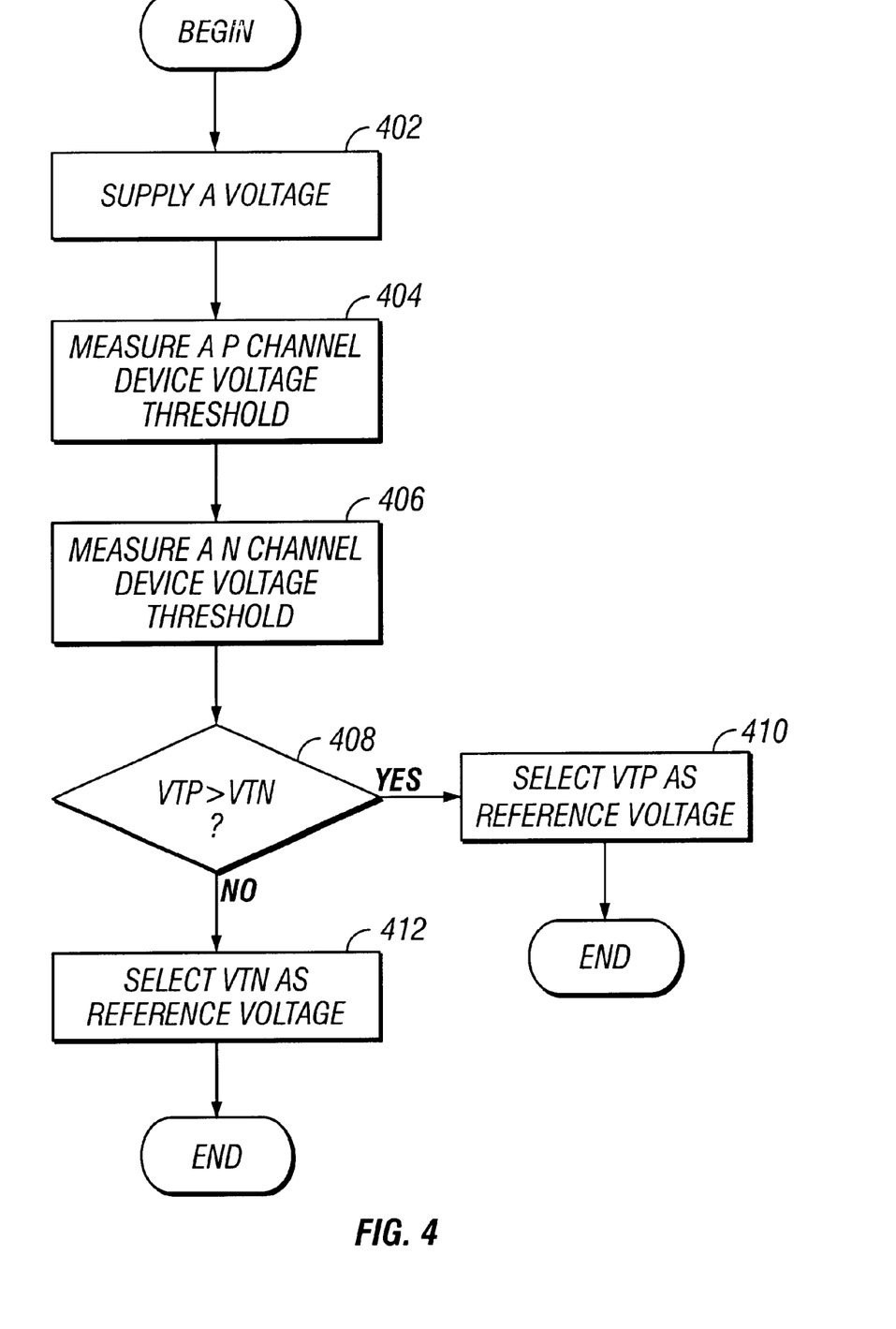
FIG. 4 is a flow diagram illustrating a method for regulating a voltage down pump in accordance with a specific embodiment of the present invention.

FIG. 4 is a flow diagram illustrating a method for generating a reference signal in accordance with a specific embodiment of the present invention. Power supply 302 supplies a voltage to reference generator 304 in block 402. Reference generator 304 generates the reference voltage by using power on reset rising edge to compare a P channel MOS voltage threshold (VTP) and an N channel MOS voltage threshold (VTN) once as the power comes on. Reference generator 304 first measures VTP in block 404. It then measures VTN in block 406. In block 408, reference generator 304 compares both VTP and VTN. If VTP is larger than VTN, VTP is then selected as the reference voltage in block 410. If VTN is larger than VTP, VTN is then selected as the reference voltage in block 412.

Figure 5:
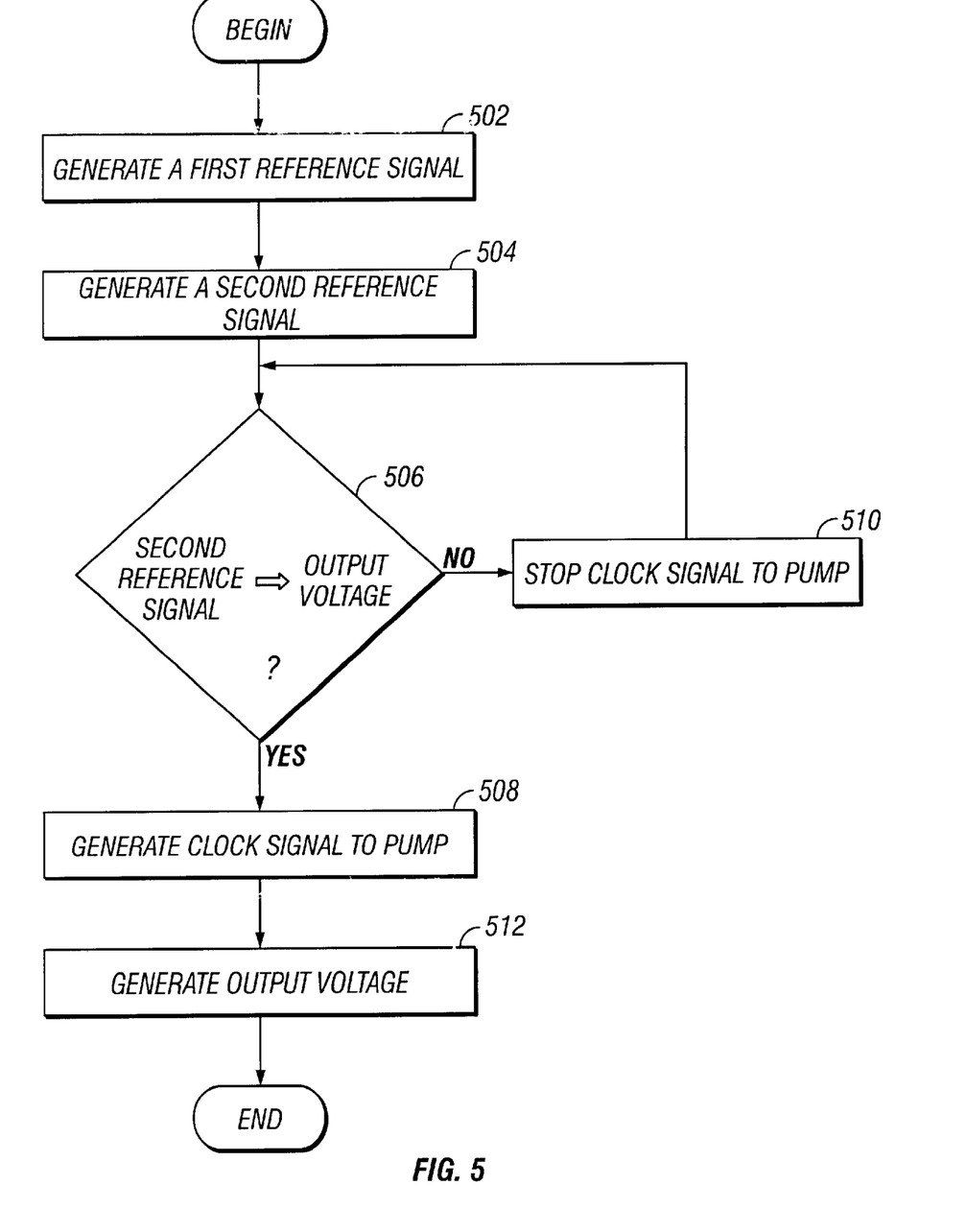
FIG. 5 is a flow diagram illustrating a method for generating a reference signal in accordance with a specific embodiment of the present invention.

FIG. 5 is a flow diagram illustrating a method for regulating a voltage down pump in accordance with a specific embodiment of the present invention. Once a first reference signal is generated in block 502 as illustrated in FIG. 4, a second reference signal is generated in block 504 by having at least one trim bit determine which voltage along a resistive string will be switched out to the second reference signal. The second reference signal is higher than the first reference signal based on which trim bit is selected. The output voltage is compared with the second reference signal in block 506. If the output voltage is less than the second reference signal, a clock signal is generated in block 508 to pump circuit 310. Whenever pump circuit 310 receives the clock signal, it pumps up and generates the output voltage in block 512. If the output voltage is greater than the second reference signal, the clock signal stops in block 510 and the output signal starts falling as it supplies load 312.

Figure 6:
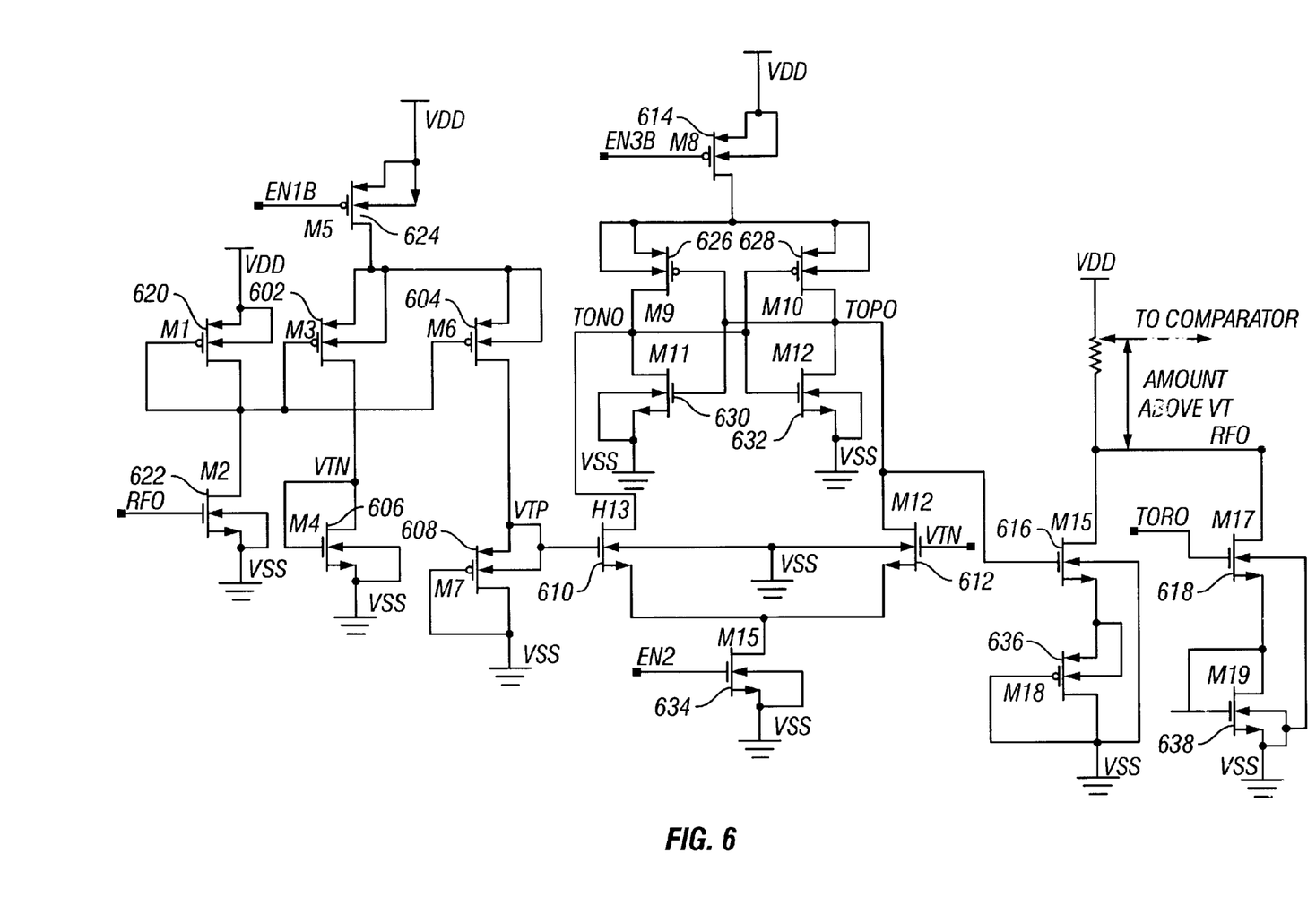
FIG. 6 is a circuit diagram of a reference generator in accordance with a specific embodiment of the present invention.
Figure 6A:
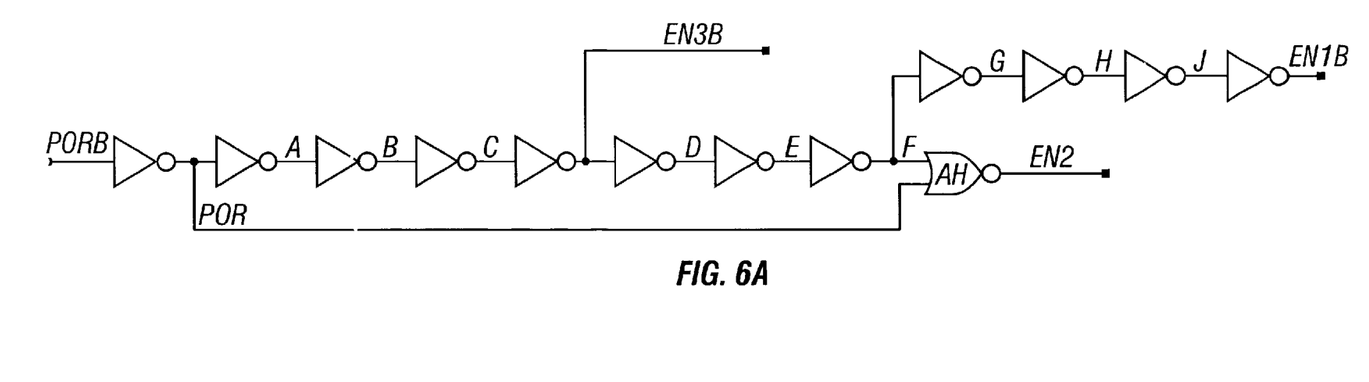
FIG. 6A is a circuit diagram illustrating the logic of a reference clock generator in accordance with a specific embodiment of the present invention.
Figure 6B:
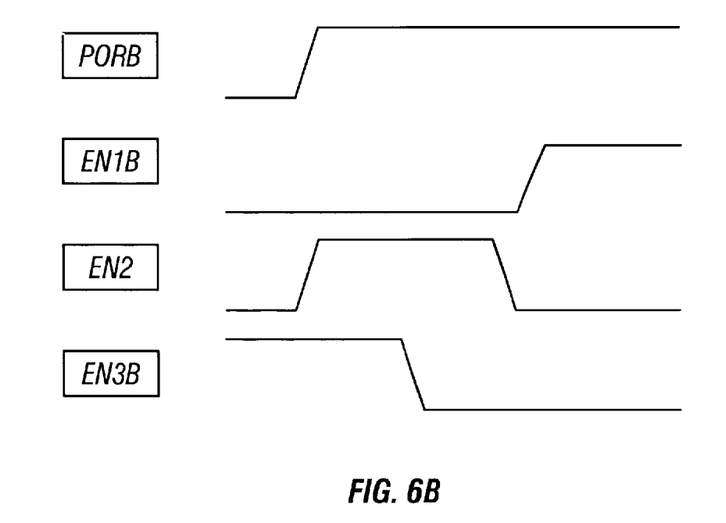
FIG. 6B is a graphical illustration showing the waveforms of signals generated by a reference clock generator in accordance with a specific embodiment of the present invention.

FIG. 6 is a circuit diagram of a reference generator in accordance with a specific embodiment of the present invention and illustrates one way to generate the first reference signal referred to in block 502 of FIG. 5. When a power on reset signal goes from a low to a high, a series of signals EN1B, EN2 and EN3B are generated. This happens when power is turned on. FIG. 6A illustrates a logic design for generating signals EN1B, EN2 and EN3B. FIG. 6B illustrates the resulting waveform signals generated by the logic design of FIG. 6A. The EN1B signal goes low and current flows through the two current sources, M3 602 and M6 604. M4 606 is a N channel device whose threshold voltage is VTN. M7 608 is a P channel device whose threshold voltage is VTP. Both VTN and VTP are compared using for example, a latching comparator. M13 610 and M14 612 each pull on the nodes TOND and TOPD. If VTP is higher than VTN, M13 610 will sink more current, otherwise M14 612 will supply more current. When EN3B signal goes low turning on M8 614, a latching takes place. If M13 610 has the highest current then TOND will remain low and TOPD will rise to VDD. On the other hand, if M14 612 has the highest current then TOPD will remain low. The latch now knows which voltage threshold is the highest. M16 616 and M17 618 are switches that select the highest voltage threshold device as the first reference signal, i.e. the reference voltage. The reference voltage signal has current supplied from a resistor network in the reference generator block 304 of FIG. 3. After the comparison is made, the comparison circuit is then turned off until the PORB signal is again applied. This saves power. Such reference could be any voltage reference and a threshold voltage measurement may not be necessary. The reference generator further includes circuit elements M1 620, M2 622, M5 624, M9 626, M10 628, M11 630, M12 632, M15 634, M18 636, and M19 638 that operate in a substantially conventional manner and are connected as shown.

Figure 7:
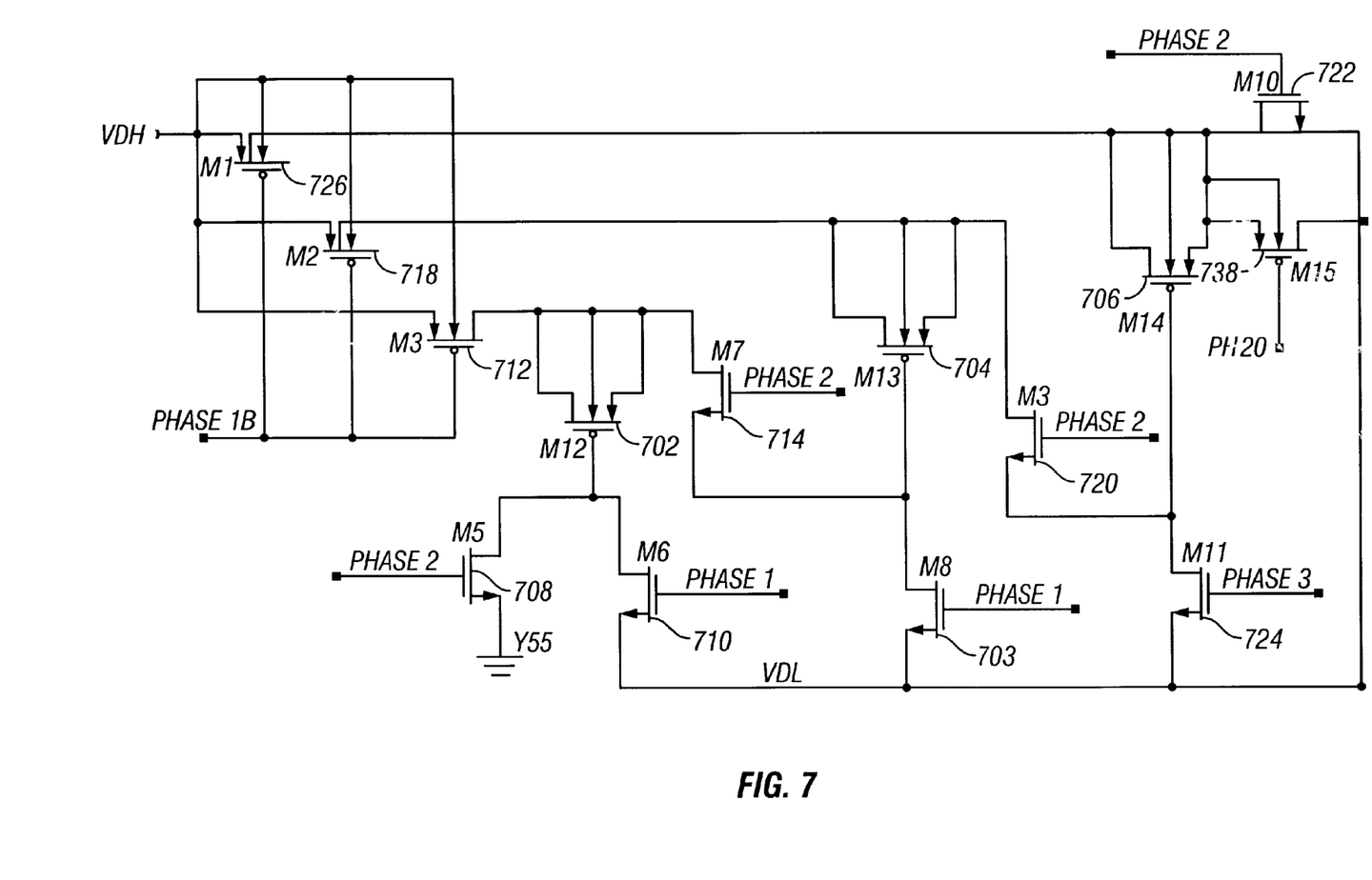
FIG. 7 is a circuit diagram illustrating of a voltage down pump circuit in accordance with a specific embodiment of the present invention.

FIG. 7 is an example of a circuit diagram illustrating a voltage down pump circuit 310 in accordance with a specific embodiment of the present invention. M12 702, M13 704, and M14 706 are capacitors. The pumping action occurs when each of the three capacitors are placed between the output voltage and VDD and charged to this voltage difference. The charging of M12 702 involves M5 708, M6 710, and M3 712. The charging of M13 704 involves M7 714, M8 716, and M2 718. The charging of M14 706 involves M9 720, M10 722, M 1724, and M1 726. The voltage down pump circuit further includes M15 728. Several capacitors, in the present example three capacitors, may be tied in parallel between the output voltage and VDD in one phase. Then, in the next phase, the capacitors may be stacked in series between the ground and the output voltage dumping changes to the output voltage. Such pumping action may also be accomplished with a few capacitors, however the pumping range may be reduced. Several devices, for example, at least four capacitors, may be used to obtain a pumping range closer to VDD. Even one capacitor will work if the maximum voltage required is less than one half of VDD.

Figure 7A:
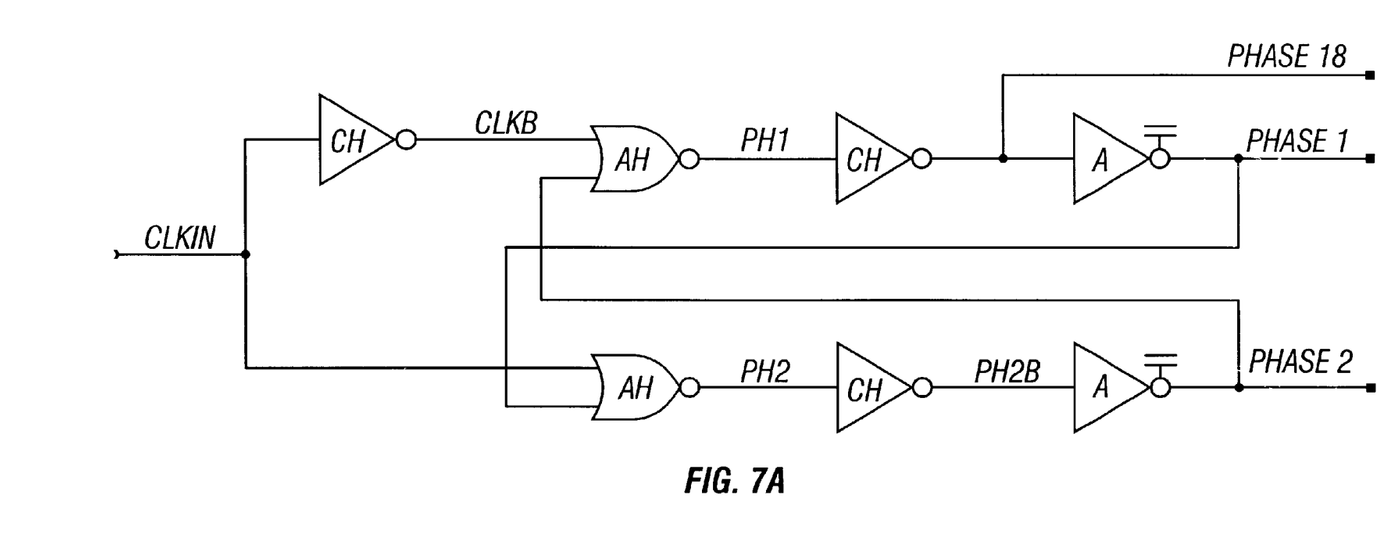
FIG. 7A is a circuit diagram illustrating the logic of a voltage down pump in accordance with a specific embodiment of the present invention.

The logic of FIG. 7 is illustrated in the circuitry shown in FIG. 7A. Voltage down pump 310 generates non-overlapping and boot strapped phases PHASE1 and PHASE2. A clock signal (CLKIN) is enabled whenever the comparator has found the output voltage less than the set voltage (a fixed amount above the threshold voltage) such that the clock signal is toggling whenever the pumping action is required, for example at 10 Mhz. If the circuit does not require pumping, the clock signal is high and PHASE1 is high while PHASE2 is low. The driver circuit that drives PHASE1 and PHASE2 are bootstrap circuits that causes PHASE1 and PHASE2 to go above VDD and turn on the N channel devices harder.

Figure 7B:
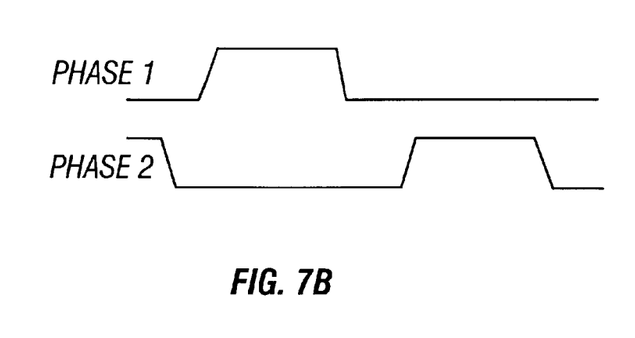
FIG. 7B is a graphical illustration showing the waveforms of signals generated by a voltage down pump in accordance with a specific embodiment of the present invention.

FIG. 7B is a graphical illustration showing the waveforms of signals PHASE1 and PHASE2 generated by a voltage down pump as illustrated in FIG. 7A.

This circuit will be used to supply a stepped-down regulated voltage for all pertinent digital circuitry. The voltage is set to a fixed delta above the threshold of the largest voltage threshold of N or P type devices. Considerable power is saved by using a lower voltage of about 0.5 volt instead of the battery voltage of 1.1 volt to 1.4 volt. The power for digital logic is proportional to the toggle frequency of each node times the node voltage swing squared. If the nominal power supply is 1.25 v, then the power reduction will be $(0.5/1.25)^2$ or 16% of the power needed if the logic was ran at full supply. The power efficiency of the pump down circuit is from 60 to 90 percent which lowers this overall efficiency. Another part of the circuit has a settable voltage regulator that allows the pumped voltage to be set to a fixed amount above the threshold of MOS devices. The output voltage is relatively constant as the battery voltage drops. This keeps the gate delays of the logic constant. This means that the voltage can be set to the lowest voltage at which the system using the lowered voltage will still work, i.e. the longest propagation delay path is just finished before the next system clock occurs.

This circuit provides a mechanism for setting the voltage for a digital circuit to the lowest possible (or nearly so) voltage that the circuit will operate at. The lowest voltage swing on each node provides the lowest power operation possible. With the regulation of output voltage just above the highest voltage threshold of MOS devices, the variation of gate delays over the complete process, power supply, and temperature range are nearly constant. The operation allows, for example, hearing aids to operate on zinc-air batteries for much longer than other techniques permit.

Figure 8:
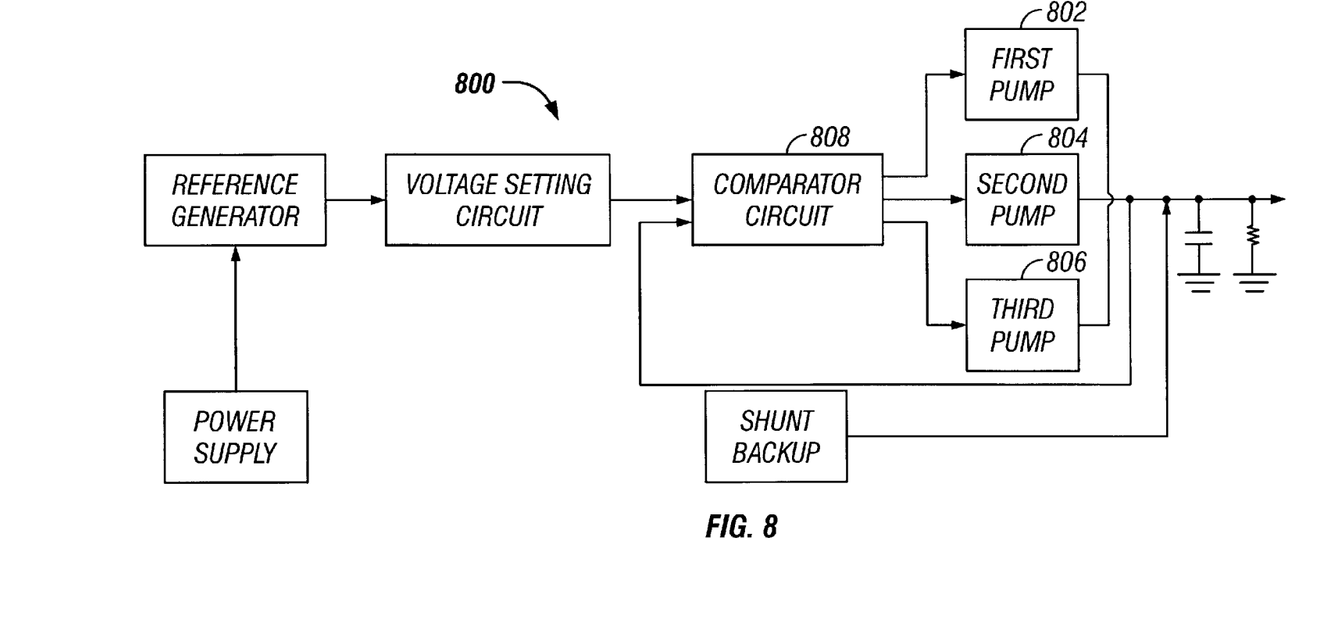
FIG. 8 is a block diagram illustrating a circuit suitable for implementing a method for regulating a voltage down pump in accordance with an alternative specific embodiment of the present invention.

While embodiments and applications of this invention have been shown and described, it would be apparent to those skilled in the art having the benefit of this disclosure that many more modifications than mentioned above are possible without departing from the inventive concepts herein. For example, FIG. 8 is a block diagram illustrating a circuit suitable for implementing a method for regulating a voltage down pump according to an alternative specific embodiment of the present invention. Instead of using a single pump, several pumps, for example three pumps 802, 804, and 806, pump up the voltage signal coming out of comparator circuit 808. The pumps may be sequentially smaller in size by half such that pump 804 is half the size of pump 802. Pump 806 is half the size of pump 804. If only one smaller pump is running, less power is used and the ripple caused by the pumping action is minimal. As the current requirements of the load increase additional larger pumps will be used. Circuit 800 may then consume less power when using several smaller pumps. The invention, therefore, is not to be restricted except in the spirit of the appended claims.

What is claimed is:

1. A method for regulating the output voltage of a voltage pump circuit, comprising:

supplying a voltage to a reference generator circuit;

measuring a first threshold voltage of a P channel device within said reference generator circuit;

measuring a second threshold voltage of a N channel device within said reference generator circuit; and generating a first reference voltage by comparing said first threshold voltage with said second threshold voltage, said first reference voltage being the largest of said first threshold voltage and said second threshold voltage.

2. The method according to claim 1, further comprising setting the output voltage of the voltage pump circuit to a first voltage above said first reference voltage.

3. The method according to claim 2 wherein said first voltage is a fixed programmable value.

4. The method according to claim 1, further comprising:

generating a second reference voltage, wherein said second reference voltage is above said first reference voltage;

comparing said second reference voltage with the output voltage of the voltage pump circuit;

generating a clock signal to the voltage pump circuit whenever the output voltage is less than said second reference voltage; and pumping up the output voltage when the voltage pump circuit receives said clock signal.

5. The method according to claim 4, further comprising supplying additional current to the output voltage when the output voltage is less than said second reference voltage.

6. The method according to claim 4, further comprising receiving at least one trim bit that selects how much said second reference voltage is above said first reference voltage.

7. An apparatus for regulating the output voltage of a voltage pump circuit, comprising:

means for supplying a voltage to a reference generator circuit;

means for measuring a first threshold voltage of a P channel device within said reference generator circuit;

means for measuring a second threshold voltage of a N channel device within said reference generator circuit; and means for generating a first reference voltage by comparing said first threshold voltage with said second threshold voltage, said first reference voltage being the largest of said first threshold voltage and said second threshold voltage.

8. The apparatus according to claim 7, further comprising means for setting the output voltage of the voltage pump circuit to a first voltage above said first reference voltage.

9. The apparatus according to claim 8 wherein said first voltage is a fixed programmable value.

10. The apparatus according to claim 7, further comprising:
   means for generating a second reference voltage, wherein said second reference voltage is above said first reference voltage;
   means for comparing said second reference voltage with the output voltage of the voltage pump circuit;
   means for generating a clock signal to the voltage pump circuit whenever the output voltage is less than said second reference voltage; and
   means for pumping up the output voltage when the voltage pump circuit receives said clock signal.

11. The method according to claim 10, further comprising means for supplying additional current to the output voltage when the output voltage is less than said second reference voltage.

12. The method according to claim 10, further comprising means for receiving at least one trim bit that selects how much said second reference voltage is above said first reference voltage.

13. A regulated voltage down pump circuit comprising:
   a reference generator circuit receiving a voltage; and
   a comparator within said reference generator circuit, comparing a first threshold voltage of a P channel device with a second threshold voltage of a N channel device, and generating a first reference voltage, said first reference voltage being the largest of said first threshold voltage and said second threshold voltage.

14. The regulated voltage down pump circuit according to claim 13, further comprising a pump generating a fixed programmable voltage above said first reference voltage as an output of said regulated voltage down pump circuit.

15. The regulated voltage down pump circuit according to claim 13, further comprising:
   a voltage setting circuit for generating a second reference voltage, wherein said second reference voltage is above said first reference voltage;
   a comparator circuit comparing said second reference voltage with an output voltage of said regulated voltage down pump circuit;
   a clock circuit generating a clock signal to at least one pump circuit whenever said output voltage is less than said second reference voltage; and
   said at least one pump circuit pumping up the output voltage when said at least one pump circuit receives said clock signal.

16. The regulated voltage down pump circuit according to claim 15, further comprising a shunt backup circuit supplying additional current to the output voltage when the output voltage is less than said second reference voltage.

17. The regulated voltage down pump circuit according to claim 15, wherein said voltage setting circuit receives at least one trim bit that selects how much said second reference voltage is above said first reference voltage.

18. The regulated voltage down pump circuit according to claim 15, further comprising at least a second pump circuit, wherein said pump circuits have different sizes.

19. An apparatus comprising:
   one or more digital circuits operable to perform at least one function;
   a power source supplying a first fixed voltage; and
   at least one pump down circuit having said first fixed voltage supplied thereto, wherein said at least one pump down circuit generates a second fixed voltage to the one or more digital circuits, said second fixed voltage being lower than said first fixed voltage and regulated to a fixed delta above the voltage threshold of the one or more digital circuits, wherein the voltage threshold is the larger of a P type or N type voltage threshold of the one or more digital circuits.

20. The apparatus according to claim 19, wherein said fixed delta is regulated by a voltage setting circuit receiving at least one trim bit that selects how much said second fixed voltage is above the voltage threshold.

21. The apparatus according to claim 19, further comprising at least a second pump down circuit, wherein said pump down circuits have different sizes.

22. An apparatus comprising:
   one or more analog circuits operable to perform at least one function;
   one or more digital circuits operable to perform at least one function;
   means for supplying a first fixed voltage; and
   means for generating a second fixed voltage supplied to the one or more analog circuits and to the one or more digital circuits, said second fixed voltage being lower than said first fixed voltage and regulated to a fixed delta above a voltage threshold of the one or more analog circuits and of the one or more digital circuits, wherein the voltage threshold is the larger of a P type or N type voltage threshold of the one or more digital circuits.

23. The apparatus according to claim 22, wherein said fixed delta is regulated by a voltage setting circuit receiving at least one trim bit that selects how much said second fixed voltage is above the voltage threshold.

* * * * *